May 7, 1940. H. A. DE VRY 2,200,161
PROJECTOR FRAMING DEVICE
Filed Oct. 14, 1937   3 Sheets-Sheet 3
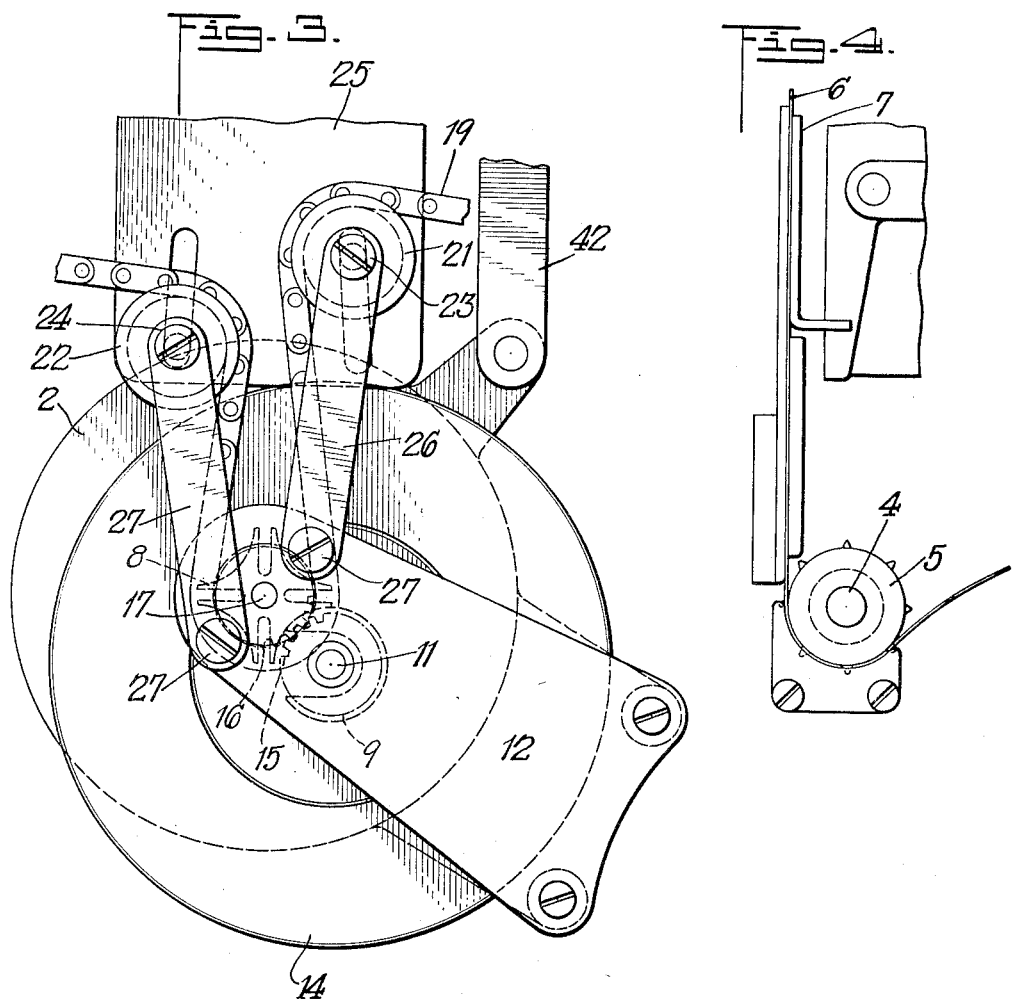
INVENTOR.
HERMAN A. DE VRY.
BY
ATTORNEY.

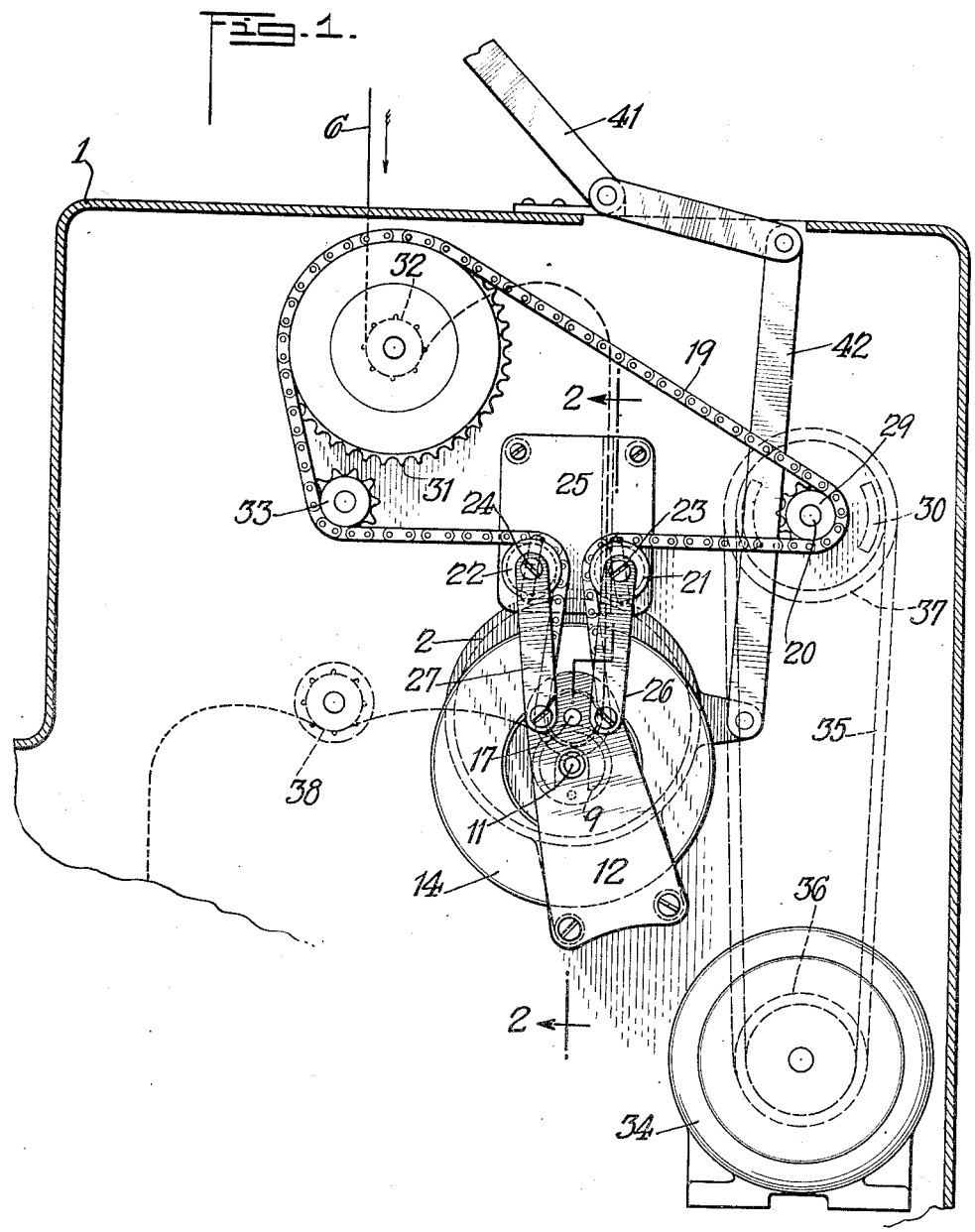

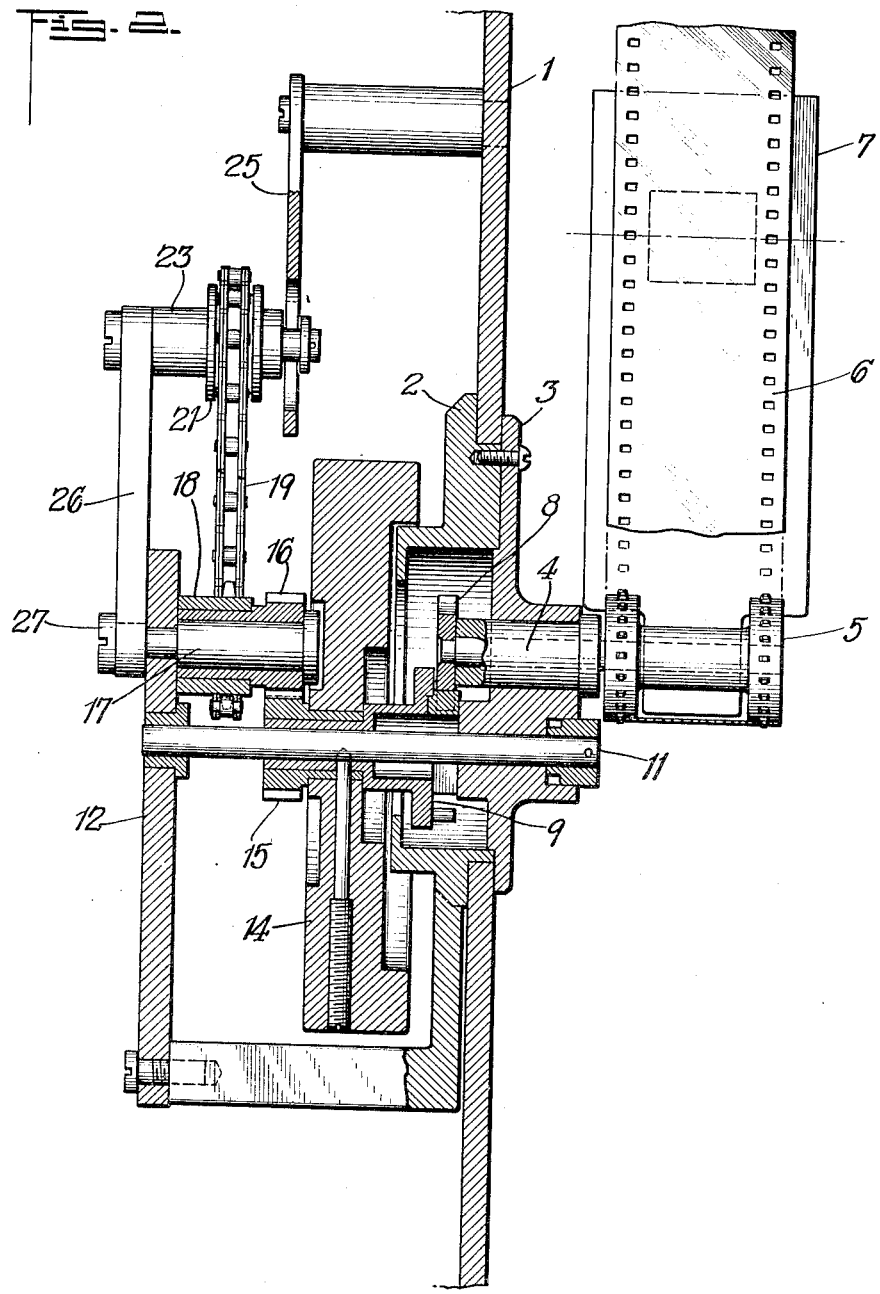

Patented May 7, 1940

2,200,161

UNITED STATES PATENT OFFICE 2,200,161

PROJECTOR FRAMING DEVICE

Herman A. De Vry, Chicago, Ill.

Application October 14, 1937, Serial No. 168,889

8 Claims. (Cl. 88—17)

This invention relates to motion picture projectors, and particularly to a new and superior framing mechanism for maintaining proper relationship, and synchronism between the projector aperture, the individual pictures on the film, and the projector shutter.

In the standard 35 mm. motion picture film, each picture or "frame" has four sprocket holes or perforations on the respective sides, and associated with each individual frame. Likewise the film traversing sprockets have sprocket teeth of a similar pitch and dimensions to match the sprocket holes in the film, and thus, in threading the film through the machine, random placement of the film upon the various sprockets may position the film with the frame of the individual picture out of register with the projector aperture, and some means is necessary for shifting the film during operation of the projector to bring the film frames into register with the aperture plate. Also the film shrinks after usage by an amount which may be 3% or greater, and since the usual projector construction is such as to position the intermittent sprocket several frames away from the aperture plate, the shrinkage of the intervening film length may be sufficient to bring the picture frame considerably out of register with the aperture plate, necessitating still further adjustment of the film position on the sprockets.

In the prior art of the construction of motion picture projectors, the majority of projectors have provided means for a sliding movement of the intermittent sprocket and its driving mechanism. This, however, is undesirable because of the undue space required and the difficulty of driving the intermittent sprocket operating mechanism in continuous synchronism with the shutter. A typical embodiment of such a mechanism is shown in my Patent No. 2,041,236. Attempts have also been made to obtain a framing movement of the intermittent sprocket without a sliding procedure, as is shown in my prior Patent No. 2,018,514.

The present invention is an improvement upon the above mentioned patents for the simplification of the mechanism, and the more accurate maintenance of strict synchronism between the intermittent sprocket drive members and the projector light shutter.

The invention consists broadly of an intermittent sprocket and Geneva star wheel movement mounted in a rotatable member journaled in the projector frame. The cam and fly wheel portion of the star wheel movement is mounted in the same frame and is driven by a gear member mounted coaxially with the intermittent sprocket shaft. The gear drive is actuated by a sprocket and chain, connected to the other actuating members of the machine. The chain passes over idler sprockets or pulleys, on each side of the chain sprocket which actuates the intermittent sprocket driving mechanism. These idler pulleys are guided in vertical slots, and are moved upward and downward by links attached to the rotatable support for the intermittent sprocket mechanism, the centers of the point of attachment of the links to the rotatable member being on opposite sides of the axis of the chain sprocket and at a distance from that axis substantially equal to the radius of the pitch circle of the sprocket. Thus, rotation of the intermittent sprocket mechanism raises one of the idler pulleys and lowers the other by an amount substantially the same as the tangential movement of the chain sprocket, thereby maintaining strict synchronism between the intermittent driving mechanism and the chain and its connected shutter and other mechanisms.

Thus, an object of the invention is to frame a motion picture film by rotation of the intermittent sprocket, and simultaneously to maintain strict synchronism between the sprocket movements and the movements of other members of the machine.

Another object of the invention is to adjust the position of loops in a drive chain, actuating the intermittent sprocket mechanism of a motion picture projector in accordance with framing movements thereof.

Still another object of the invention is to rotate the intermittent sprocket of a motion picture projector for framing the actuated film and simultaneously maintain synchronism between the sprocket and an associated shutter by adjustment of loops in a drive chain.

A further object of the invention is to position an intermittent sprocket adjacent a framing plate and adjust the cyclic position of the sprocket for framing an associated film on the framing plate by rotation of the sprocket-actuating mechanism about a fixed axis and maintain synchronism of operation of the intermittent sprocket driving mechanism with an associated shutter by adjustment of loops in a driving chain.

Other objects and structural details of the invention will be apparent from the following description when read in connection with the accompanying drawings, wherein Fig. 1 is a side view partly in section of the framing mechanism of the invention as applied to a projector;

Fig. 2 is a front view in section of the same mechanism;

Fig. 3 is an enlarged view of the framing mechanism in a different position; and Fig. 4 is a side view of the sprocket and framing plate.

Referring to the figures, the projector frame 1 has a circular opening provided therein, within which there is journaled an auxiliary frame member 2 which is fitted closely to the opening in the frame member 1. Attached to the auxiliary frame 2 there is provided a bearing plate 3, which supports the shaft 4 upon which is mounted the intermittent sprocket 5. The sprocket 5 cooperates with the film 6 to move it past the aperture plate 7. Upon the end of the shaft 4, which is within the frame 2, there is mounted the star wheel 8 of the Geneva movement, which cooperates with the cam wheel 9. The wheel 9 is mounted upon a shaft 11 which is also journaled at one end in the plate 3 and at the other end in a support member 12. The shaft 11 also has mounted thereon a fly-wheel 14 and a pinion 15. Various bushings for the support and adjustment of the several members are provided, as shown, but since they are customary mechanical details they are not especially described.

A second pinion 16 is mounted upon a bearing shaft 17, the axis of which is aligned with the axis of the shaft 4, and carried upon the plate 12. Attached to the pinion 16 there is also provided a chain sprocket 18, which cooperates with a drive chain 19 for the actuation of the intermittent mechanism.

The chain 19 passes over pulleys 21 and 22, as is particularly well shown in Fig. 3. The pulleys 21 and 22 are carried upon bearing shafts 23 and 24, which are movable and guided by slots in the plate 25 and are moved by the links 26 and 27, which in turn are attached to the plate 12 by screws 27, as shown. The screws 27 desirably have their axes coincident with the pitch circle of the sprocket 18.

The chain also passes over a drive sprocket 29 and a gear 31 which drives the film feed sprocket 32, and also over the idler sprocket 33. The shutter 30 is mounted on the shaft 20 which carries the drive sprocket 29, and is associated with a safety shutter.

The projector may be driven by a motor 34 and belt 35 operating between pulleys 36 and 37, as shown in Fig. 1. The usual take-up sprocket 38 is also provided, as shown, and driven in any convenient manner.

In the operation of the device of the invention, the film is drawn from the supply reel over the feed sprocket 32, along the aperture plate 7, over the framing opening and over the intermittent sprocket 5, thence to the take-up sprocket 38. Thereafter the motor 34 may be energized to drive the projector. Accordingly, the chain 19 rotates the sprocket 18, the pinion 16, the pinion 15, the fly wheel 14, and the cam and pin member 9. During each revolution of the cam 9, the pin thereon engages once with the star wheel 8 to rotate the shaft 4 and the sprocket 5 by one-quarter of a revolution, thereby advancing the film by one picture frame for each revolution of the cam 9. In order to "frame" the film, the lever 41 and link 42 are moved to rotate the member 2. Rotation of the member 2 moves the cam member 9 around the axis of the sprocket 5, thereby adjusting the position in which it is stopped by the cam 9 for projection of the successive picture frames. Rotation of the member 2 in one direction will advance the stopped position of the film 6 downward and movement in the reverse direction will set back the stopped position of the film by an appropriate amount. Simultaneously, rotation of the member 2 rotates the member 12 and moves the respective links 26 and 27 upward and downward, thereby adjusting the position of the loops in the chain 19 over the pulleys 21 and 22. By virtue of the fact that the centers of the pins 27 coincide with the pitch circle of the sprocket 18, the respective movements of the pulleys 21 and 22 are substantially the same in direction and magnitude as the tangential movement of the sprocket 18 produced by the framing movement, and accordingly no change in synchronization occurs between the chain 19 and the cam 9. Thus, since the synchronization between the chain 19 and the shutter driven from the sprocket 33 remains constant and the synchronous relationship between the sprocket 18 and the chain 19 remains unchanged, the shutter remains in synchronism with the cam 9 and the intermittent mechanism during the framing movements above described.

The device of the invention thus provides a rugged, simple and accurate framing mechanism requiring a minimum number of parts and no members for sliding movement of the intermittent sprocket member.

While there is above described but a single embodiment of the device of the invention, it is possible to produce still other embodiments without departure from the inventive concept herein disclosed, and it is therefore desired that only such limitations be imposed upon the appended claims as are stated therein or required by the prior art.

What I desire to claim and protect by United States Letters Patent is:

1. A motion picture apparatus comprising in combination, a framing plate and aperture, an intermittent sprocket, mechanism for intermittently rotating the said sprocket, means for rotating said mechanism around the axis of said sprocket, and means for driving the said mechanism while maintaining synchronism with other members comprising a chain, a sprocket cooperating between said chain and said mechanism, a pair of idler members forming a loop in said chain, and link members each pivoted at one end to one of said idler members and at the other end to said rotatable means to adjust the position of said chain upon said sprocket in accordance with the framing movements of said rotatable means and in two directions.

2. A motion picture apparatus comprising in combination, an intermittent motion mechanism, a rotatable frame for the support thereof, an intermittent sprocket concentric with the axis thereof actuated by said intermittent mechanism, a second sprocket for the driving of said mechanism, a drive chain cooperating with said second sprocket, and means for maintaining the relationship between said chain and said intermittent motion mechanism unchanged during rotative framing movements thereof, comprising a pair of idler pulleys, a guide member for said pulleys having guiding slots therein, and links each pivoted at one end to one of said pulleys and at the other end to said rotatable frame.

3. A motion picture apparatus comprising in combination, an intermittent motion mechanism, a rotatable frame for the support thereof, an intermittent sprocket concentric with the axis thereof actuated by said intermittent mechanism, a second sprocket for the driving of said mechanism, a drive chain cooperating with said second sprocket, and means for maintaining the relationship between said chain and said intermittent motion mechanism unchanged during rotative framing movements thereof, comprising a pair of idler pulleys, a guide member for said pulleys having guiding slots therein, and links cooperating between said pulleys and said rotatable frame, the centers of the points of attachment of said links to said rotatable frame being coincident with the pitch circle of said chain sprocket.

4. A motion picture apparatus comprising in combination, a framing plate, an intermittent film-sprocket for drawing a film thereover, a Geneva star wheel movement for the actuation of the said sprocket, a rotatable support for said sprocket and said Geneva movement having its axis coincident with the axis of said sprocket, a shaft for the cam of said Geneva movement, the said shaft being mounted in said rotatable support eccentric to the axis of said sprocket, a flywheel and drive pinion upon said shaft, a second drive pinion having its axis concentric with the axis of said film-sprocket, a chain sprocket associated with said second pinion, a chain cooperating therewith, a pair of pulleys forming a loop in said chain, guide means for said pulleys, links each pivoted at one end to one of said pulleys and at the other end to the said rotatable support, and a hand lever mechanism rotating said rotatable support to adjust the position of said chain upon said chain sprocket in accordance with the framing movements of said rotatable support.

5. In combination, a pair of pulley members, a drive chain passing therebetween, a loop in said chain, a driven sprocket in the bight of said loop, a pair of idlers defining the position of said loop, means for rotating said sprocket independently of said drive chain, and means for adjusting the said idlers in accordance with the independent rotation of said sprocket, comprising a support for said sprocket and link members connected with the idlers and connected with the support at a distance from the axis of said sprocket substantially the same as the pitch radius of said sprocket.

6. In combination, a pair of pulley members, a drive chain passing therebetween, a loop in said chain, a driven sprocket in the bight of said loop, a pair of idlers defining the position of said loop, means for rotating the sprocket independently of said drive chain, and means for adjusting said idlers in accordance with the independent rotation of said sprocket comprising a rotatable support for said sprocket, link members each pivotally connected at one end with one of the idlers and pivotally connected at the opposite end with the rotatable support, the pivotal connections with the rotatable support being disposed at a distance from the axis of said sprocket substantially the same as the pitch radius of said sprocket.

7. In combination, a pair of pulley members, a drive chain passing therebetween, a loop in said chain, a driven sprocket in the bight of said loop, a pair of idlers defining the position of said loop, means for rotating the sprocket independently of said drive chain, means for adjusting said idlers in accordance with the independent rotation of said sprocket comprising a rotatable support for said sprocket, link members each pivotally connected at one end with one of the idlers and pivotally connected at the opposite end with the rotatable support, and means for guiding the adjusting movements of the idlers, the pivotal connections of the link members with the rotatable support being disposed with the axes thereof substantially coincident with the pitch circle of the driven sprocket.

8. A motion picture mechanism having an aperture and means for moving film past said aperture including an intermittent drive mechanism for advancing the film, a sprocket wheel driving said mechanism, a second sprocket wheel spaced from said first named sprocket wheel, a flexible drive element connecting said sprocket wheels, a rotatable support for said intermittent mechanism, rotatable to frame the film picture at the aperture, and means actuated by rotation of said support to change the course of the drive element between said sprocket wheels, said last named means comprising links pivoted to said support, pulleys pivoted to said links and stationary guide means for the pulley ends of said links.

HERMAN A. DE VRY.